US012321139B2

(12) United States Patent
Liu

(10) Patent No.: US 12,321,139 B2
(45) Date of Patent: Jun. 3, 2025

(54) WATERPROOF PROTECTIVE CASE FOR SMART WATCHES

(71) Applicant: Yulan Liu, Xinyu (CN)

(72) Inventor: Yulan Liu, Xinyu (CN)

( * ) Notice: Subject to any disclaimer, the term of this patent is extended or adjusted under 35 U.S.C. 154(b) by 330 days.

(21) Appl. No.: 17/888,968

(22) Filed: Aug. 16, 2022

(65) Prior Publication Data

US 2024/0036526 A1 Feb. 1, 2024

(30) Foreign Application Priority Data

Aug. 1, 2022 (CN) ........................ 202222005294.X

(51) Int. Cl.
*G04G 17/08* (2006.01)
*G04B 37/08* (2006.01)

(52) U.S. Cl.
CPC ........... *G04G 17/08* (2013.01); *G04B 37/086* (2013.01)

(58) Field of Classification Search
CPC .............................. G04G 17/08; G04B 37/086
USPC .......................................................... 368/292
See application file for complete search history.

(56) References Cited

U.S. PATENT DOCUMENTS

2018/0173166 A1* 6/2018 Kayano .................. G04G 17/08
2020/0233380 A1* 7/2020 Rothkopf ............... G04B 39/02
2021/0263475 A1* 8/2021 Yamakawa ............ G04G 17/04
2022/0397866 A1* 12/2022 Tajima ................... G04B 37/08

FOREIGN PATENT DOCUMENTS

CN 109388187 A * 2/2019 ............. G04G 17/08
CN 109991829 A * 7/2019
CN 212749559 U * 3/2021
CN 212752629 U * 3/2021
CN 212933269 U * 4/2021
CN 216145092 U * 3/2022

* cited by examiner

*Primary Examiner* — Regis J Betsch
*Assistant Examiner* — Kevin Andrew Johnston
(74) *Attorney, Agent, or Firm* — Birchwood IP

(57) ABSTRACT

A waterproof protective case for a smart watch, comprising a main body, a transparent cover, a waterproof ring and a bottom cover. The transparent cover is bonded to an opening on top of the main body by glue. Directly bonding with glue not only has the function of installing the transparent cover, but the cured glue forms an apron and has the function of waterproofing. A waterproof ring is additionally arranged on an inner wall surface of the main body, and is combined with the inner wall surface by means of integral inlay molding, which does not need to be installed separately, does not have the problem of falling off. The function of the waterproof ring is to press the glass surface of the smart watch to prevent water vapor from seeping into the inside of the watch, so that the protective case can achieve a better waterproof effect.

7 Claims, 15 Drawing Sheets

WATERPROOF PROTECTIVE CASE FOR SMART WATCHES

CROSS-REFERENCE TO RELATED APPLICATIONS

This application claims the benefit and priority of Chinese patent application No. 202222005294.X, filed on Aug. 1, 2022, disclosure of which is hereby incorporated by reference in its entirety.

TECHNICAL FIELD

The present application relates to technologies in the field of electronic products, and in particular, to a waterproof protective case for smart watches.

BACKGROUND

Currently, most of the smartwatches on the market are not very water resistant. For the protective case of the smart watch, the existing products can only be said to play a role in preventing the smart watch from bumping, but its sealing performance is not good, and it is neither waterproof nor dustproof Therefore, when wearing a smart watch normally, the wearer will not be in direct contact with water like wearing a mechanical or quartz watch.

Therefore, the prior patent CN 2021216180993 discloses a waterproof watch case and a waterproof watch with waterproof function, which comprises a base and a top cover with four arc-shaped corners arranged on the base. The upper end of the top cover is provided with an electronic glass plate with four arc-shaped corners, and the upper surface of the top cover is provided with a groove with four arc-shaped corners. The groove and the electronic glass plate abut against correspondingly, a sealing gasket made of TPE rubber material is formed inside the groove by over-molding, and the upper end of the sealing gasket is clamped with the groove, and the lower end of the sealing gasket is abut against the base.

However, in the above-mentioned published patent, only the first level of waterproofing can be achieved through the sealing gasket at the installation position between the electronic glass plate and the top cover, and once the water seepage problem occurs, the water can still penetrate into the watch. Therefore, it is considered that the waterproof effect is not ideal.

SUMMARY

In view of this, the main purpose of this application is to provide a waterproof protective case for smart watches, which eliminates the TPE sealing gasket between the glass plate and the top cover, and uses glue instead; Then, a waterproof ring is added to the inner wall surface of the main body of the protective case, and the waterproof ring can be pressed on the surface of the smart electronic watch, thereby providing further waterproofing, and the waterproofing effect is better.

To achieve the above purpose, the application adopts the following technical solutions:

A waterproof protective case for a smart watch, comprising

- a main body, comprising a first wrapping edge, a second wrapping edge, a third wrapping edge and a fourth wrapping edge, a cavity for enclosing the smart watch is formed by connecting the wrapping edges end to end;

through holes for corresponding to buttons of the smart watch are arranged on one of sets of the wrapping edges opposite to each other; a dodge opening for movement of a watch strap of the smart watch is arranged on the other set of the wrapping edges opposite to each other.
- a transparent cover, covering an opening on top of the main body, a concave platform is arranged on inner side of a top edge of the cavity of the main body, the transparent cover is fixed to the concave platform by glue, and the transparent cover is connected to the concave platform and the glue between the transparent cover and the concave platform is cured to form an aprons;
- a waterproof ring, which is configured as an annular structure, and the waterproof ring is combined with an inner wall surface of the main body by means of integral inlay molding.

As a preferred solution, the first, second, third, and fourth wrapping edges respectively comprise a top edge and a side edge, wherein the top edge is folded toward middle, so that the size of the opening on the top is smaller than the size of the cavity, wherein a waterproof groove is provided on an inner wall surface where the top edge and the side edge meet, wherein the waterproof ring is embedded in the waterproof groove and is integrally formed with the main body by means of injection molding.

As a preferred solution, the glue between the transparent cover and the concave platform is cured to form an apron.

As a preferred solution, further comprising a bottom cover, which is snapped on the main body.

As a preferred solution, bottoms of a set of the wrapping edges opposite to each other of the main body without the dodge opening is provided with a first inverted buckle, and a set of the wrapping edges opposite second of the bottom cover is provided with a second inverted buckle, wherein when the first inverted buckle is combined with the second inverted buckle, the bottom cover is fixed to the main body.

As a preferred solution, the positions on both sides of the bottom cover corresponding to the watch strap of the smart watch are provided with strap button holes.

As a preferred solution, a pressing block is provided on the strap button hole.

As a preferred solution, the transparent cover is tempered glass, and an explosion-proof film is compounded on one side of the tempered glass.

As a preferred solution, the main body is made of hard plastic or rubber, and the waterproof ring is made of soft plastic, rubber, or silicone.

As a preferred solution, the through holes corresponding to the buttons of the smart watch comprise a first through hole, a second through hole and a third through hole located on the first wrapping edge, and a fourth through hole located on the third wrapping edge.

Compared with the prior art, the present application has obvious advantages and beneficial effects. Specifically, it can be known from the above technical solutions, a waterproof protective case for a smart watch, comprising a main body, a transparent cover, a waterproof ring and a bottom cover. The transparent cover is bonded to an opening on top of the main body by glue. Directly bonding with glue not only has the function of installing the transparent cover, but the cured glue forms an apron and has the function of waterproofing. Compared with the conventional technology, the present application does not need to form a TPE sealing gasket at the assembly position between the glass plate and the top cover. Because even if the TPE sealing gasket is present, the glass plate still needs to be glued to the top cover. In the present application, the TPE sealing gasket is directly replaced with glue, which realizes the bonding and fixing and simultaneously plays the waterproof function.

In particular, a waterproof ring is additionally arranged on an inner wall surface of the main body, and the waterproof ring is combined with the inner wall surface of the main body by means of integral inlay molding, which does not need to be installed separately and does not have the problem of falling off. The function of the waterproof ring is: when the protective case is placed on the smart watch, the waterproof ring is used to press the glass surface of the smart watch. Even if the rubber ring formed by the curing of glue has the risk of water seepage, the waterproof ring can prevent water vapor from seeping into the inside the smart watch, so as to achieve a better waterproof effect of the watch protective case.

To more clearly describe the structural features and effects of the present application, the present application will be described in detail below with reference to the accompanying drawings and specific embodiments.

Figure 1:
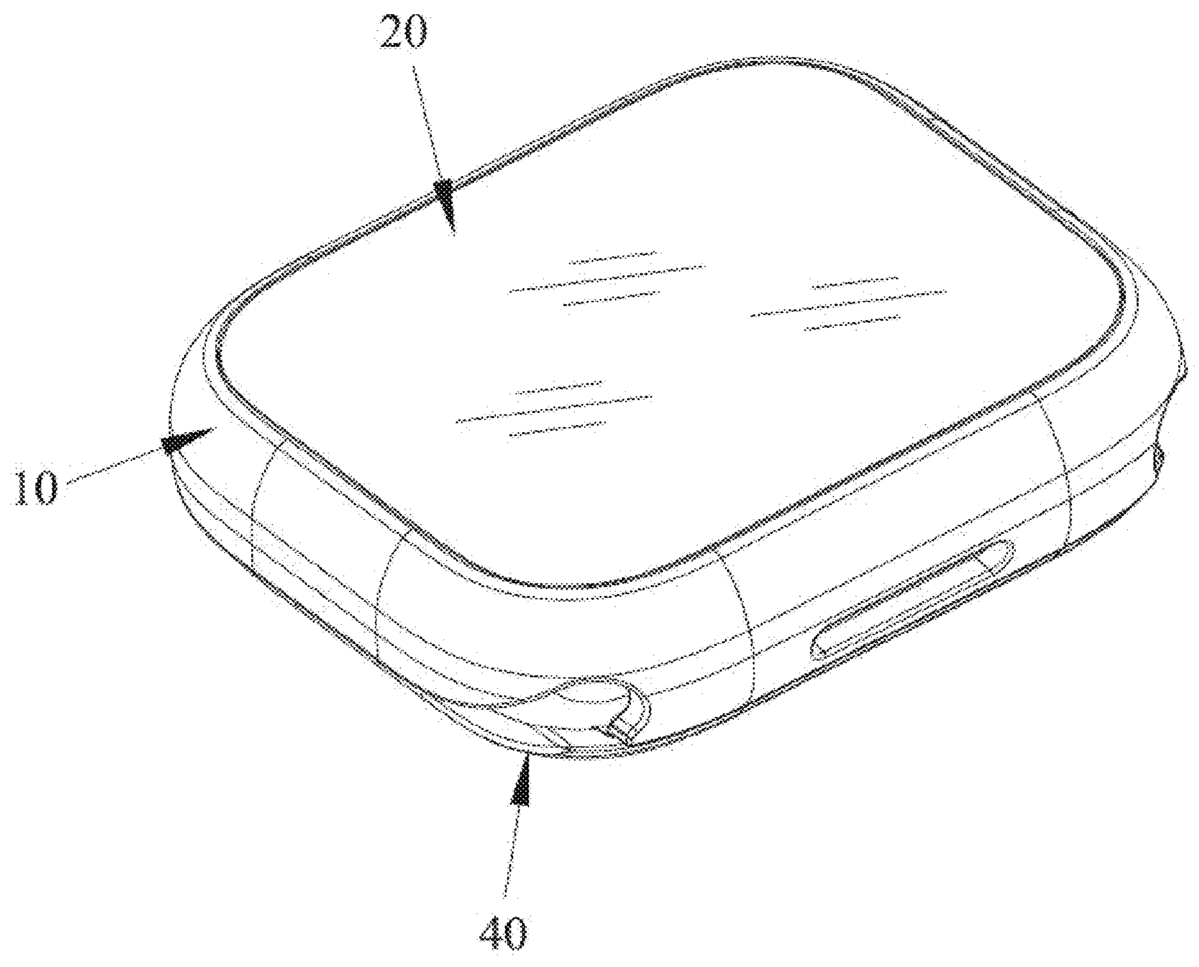
FIG. 1 is a schematic perspective view of a first embodiment of the present application.
Figure 2:
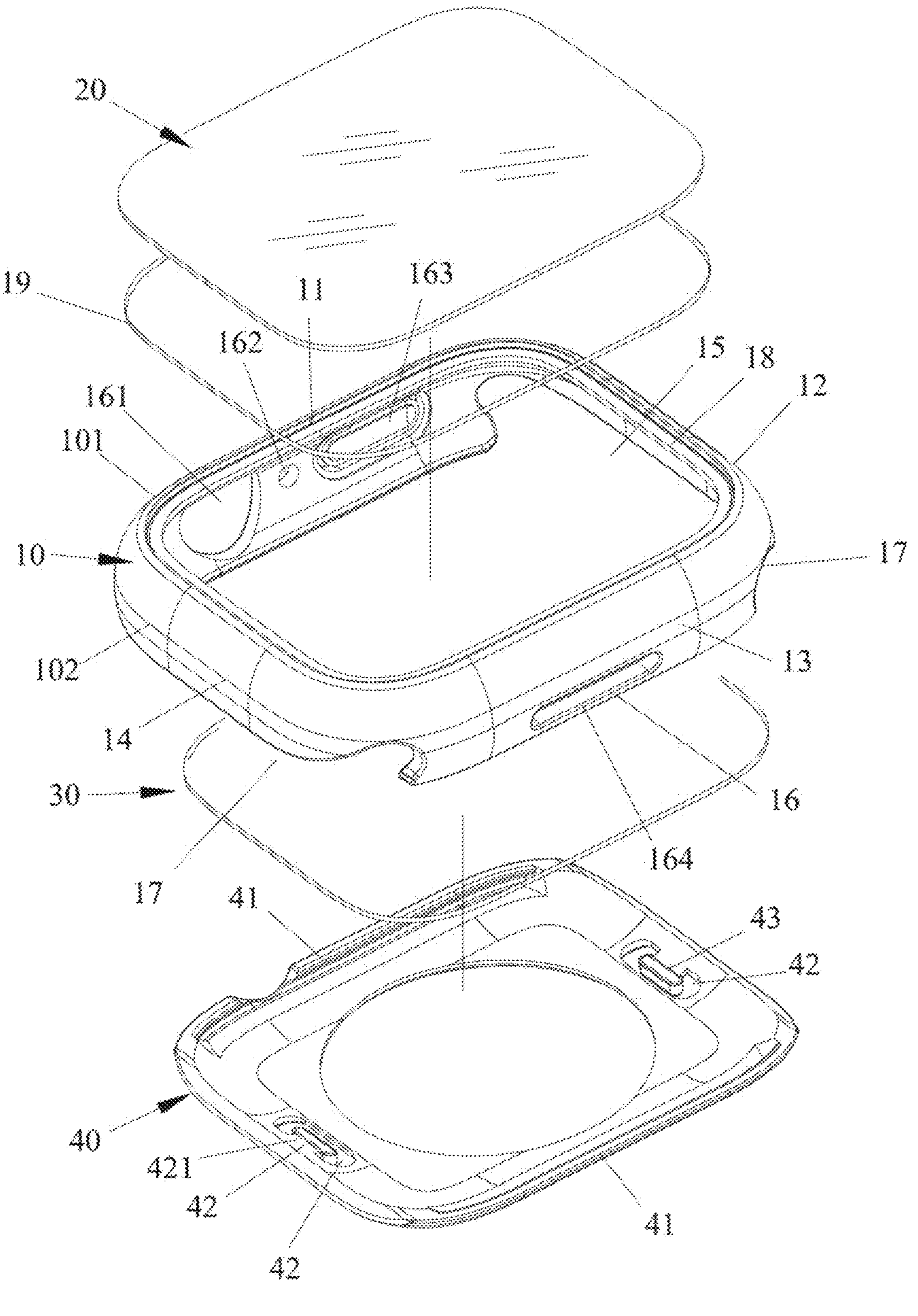
FIG. 2 is an exploded view of the first embodiment of the present application.
Figure 3:
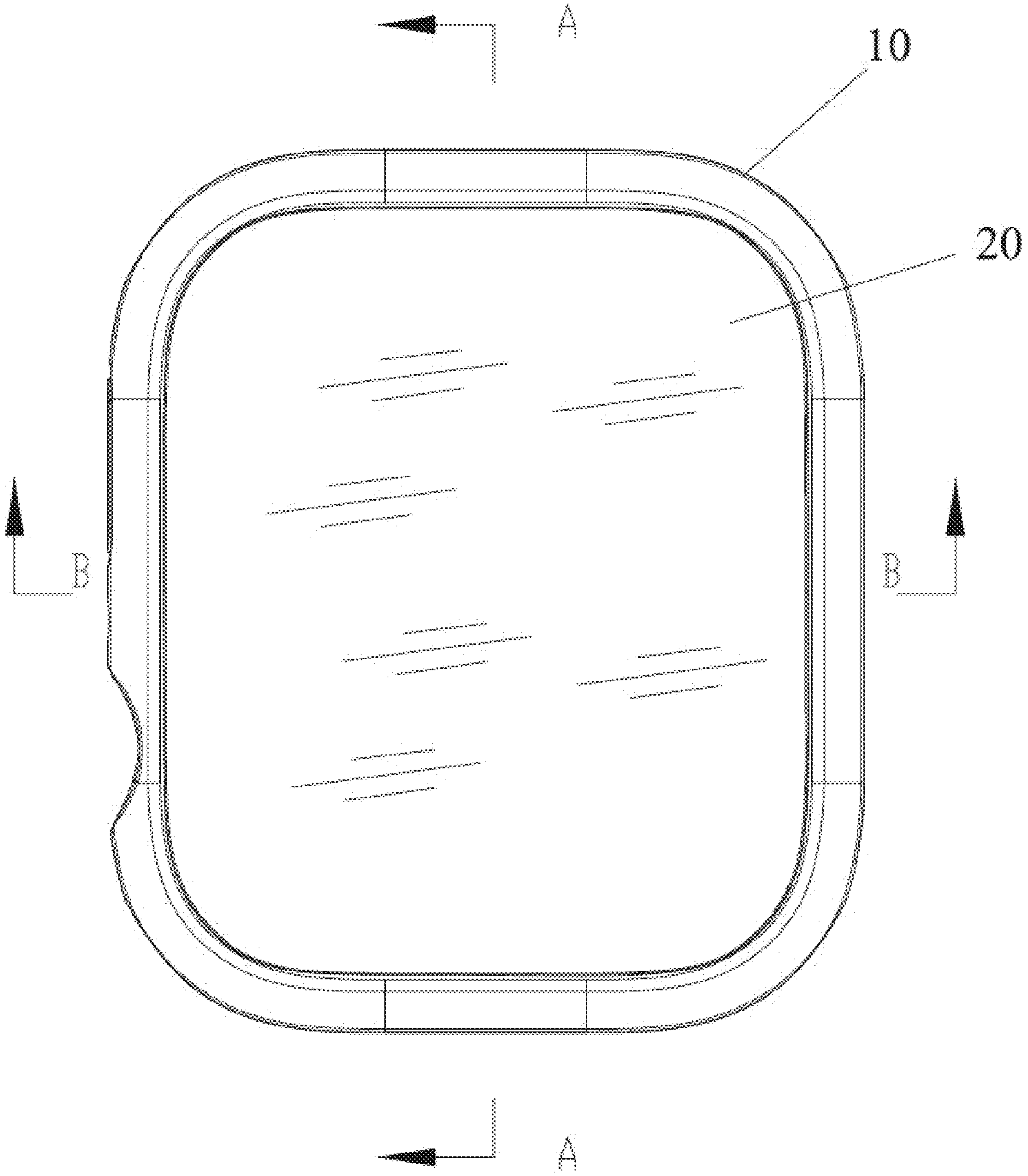
FIG. 3 is a top view of the first embodiment of the present application.

| Reference signs: | |
|---|---|
| 10. Main body | 101. Top edge |
| 102. Side edge | 103. Waterproof groove |
| 104. First inverted buckle | 11. Firstwrapping edge |
| 12. Second wrapping edge | 13. Third wrapping edge |
| 14. Fourth wrapping edge | 15. Cavity |
| 16. Through hole | 161. First through hole |
| 162. Second through hole | 163. Third through hole |
| 164. Fourth through hole | 17. Dodge opening |
| 18. Concave platform | 181. Glue overflow groove |
| 19. Apron | 1001. Display surface |
| 1002. Anti-collision protrusion | 1003. Diamond |
| 20. Transparent cover | 30. Waterproof ring |
| 40. Bottom cover | 41. Second inverted buckle |
| 42. Strap button hole | 43. Press block |
| 1041. First buckle groove | 1042. First hook portion |
| 411. Second buckle groove | 412. Second hook portion |
| 421. Cantilever | 1004. Barb |

DETAILED DESCRIPTION

Embodiment 1

FIGS. 1 to 7 show the specific structure of the first preferred embodiment of the present application, which is a waterproof protective case for smart watch, comprising a main body 10, a transparent cover 20, a waterproof ring 30 and a bottom cover 40.

The main body 10 comprises a first wrapping edge 11, a second wrapping edge 12, a third wrapping edge 13 and a fourth wrapping edge 14; a cavity 15 for enclosing the smart watch is formed by connecting the wrapping edges end to end. The cavity 15 is used for accommodating the smart watch. The outer periphery of the smart watch can be surrounded by the first wrapping edge 11, the second wrapping edge 12, the third wrapping edge 13 and the fourth wrapping edge 14, so as to prevent collision and scratches.

Through holes 16 for corresponding to buttons of the smart watch are arranged on one of sets of the wrapping edges opposite to each other; a dodge opening 17 for movement of a watch strap of the smart watch is arranged on the other set of the wrapping edges opposite to each other. The through holes 16 can be arranged in different ways according to different watch models, and the number of through holes 16 can also be increased or decreased due to the different number of buttons for different models of watches. In this embodiment, the through holes 16 corresponding to the buttons of the smart watch comprise a first through hole 161, a second through hole 162 and a third through hole 163 located on the first wrapping edge 11, and a fourth through hole 164 located on the third wrapping edge 13. The first through hole 161 is a knob through hole for the knob of the smart watch to pass through, the second through hole 162 is a microphone hole, the third through hole 163 is a button hole, and moreover, a key press block is arranged in the third through hole 163. The key press block is a colloid formed by an integral extension of the main body. The function of the key press block is to assist the user to press the keys of the smart watch more easily, that is, the user presses on the key press block, and then is touched the smart watch buttons by the key press block. The fourth through hole 164 is a slot hole.

The transparent cover 20 is tempered glass, and one side of the tempered glass is compounded with an explosion-proof film. The explosion-proof film is a colloidal structure formed by a mesh-like metal wire and a transparent colloid. The explosion-proof glue is combined with the tempered glass by means of heat curing or gluing. The transparent cover 20 is covered at the top opening position of the main body 10, and the surface of the transparent cover 20 is basically flush with the top surface of the main body, and there will not be any convex feeling. Preferably, the transparent cover 20 is shorter than the top surface of the main body, so as to protect the glass material of the transparent cover 20 from being scratched. A sunken space for installing the transparent cover 20 can be formed by the concave platform 18, so as to avoid the transparent cover 20 from bulging upward due to the thickness of the transparent cover 20 after installation.

A concave platform 18 is arranged on inner side of a top edge of the cavity 15 of the main body 10, the transparent cover 20 is fixed to the concave platform 18 by glue. A sunken space for installing the transparent cover 20 can be formed by the concave platform 18, so as to avoid the transparent cover 20 from bulging upward due to the thickness of the transparent cover 20 after installation. The concave platform 18 also plays a role of limiting position, and the baffles formed around the concave platform 18 can prevent the transparent cover 20 from moving, skewed and uneven when installed. The inner side of the bottom surface of the concave platform 18 is also provided with a glue overflow groove 181 for preventing the glue from overflowing, which on the one hand facilitates the infiltration of the glue and makes the glue stick more firmly, and on the other hand can also play a waterproof function.

It should be noted that, the transparent cover 20 and the concave table 18 are only bonded by glue, and no additional TPE sealing gasket is required. After the glue between the transparent cover 20 and the concave table 18 is cured, an apron 19 may be formed. The main function of the glue is to combine the transparent cover 20 with the main body 10. Besides, the cured apron 19 can also play a waterproof function at the same time.

In this embodiment, a waterproof ring 30 is additionally provided inside the cavity 15 of the main body 10. The waterproof ring 30 is an annular structure, and the waterproof ring 30 is combined with the inner wall surface of the main body 10 by means of integral inlay molding. The function of the waterproof ring 30 is to press the glass surface of the smart watch to prevent water vapor from penetrating into the inside of the smart watch.

More specifically, the first wrapping edge 11, second wrapping edge 12, third wrapping edge 13, and fourth wrapping edge 14 of the main body 11 respectively comprise a top edge 101 and a side edge 102, wherein the top edge 101 is folded toward middle, so that the size of the opening on the top is smaller than the size of the cavity 15, wherein a waterproof groove 103 is provided on an inner wall surface where the top edge 101 and the side edge 102 meet, wherein the waterproof ring 30 is embedded in the waterproof groove 103 and is integrally formed with the main body 10 by means of injection molding. Injection molding is also known as over-molding or integral inlay molding.

Figure 4:
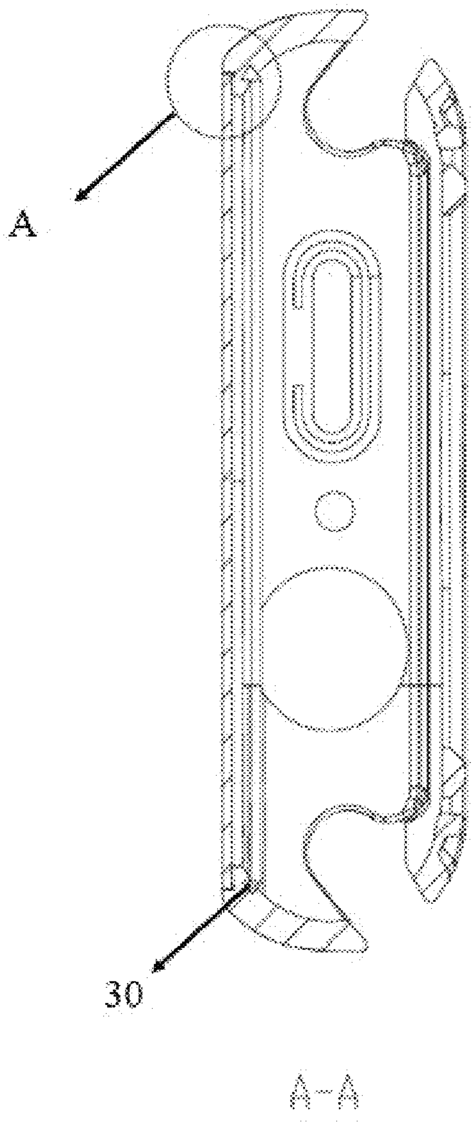
FIG. 4 is the schematic diagram of A-A in FIG. 3.
Figure 5:
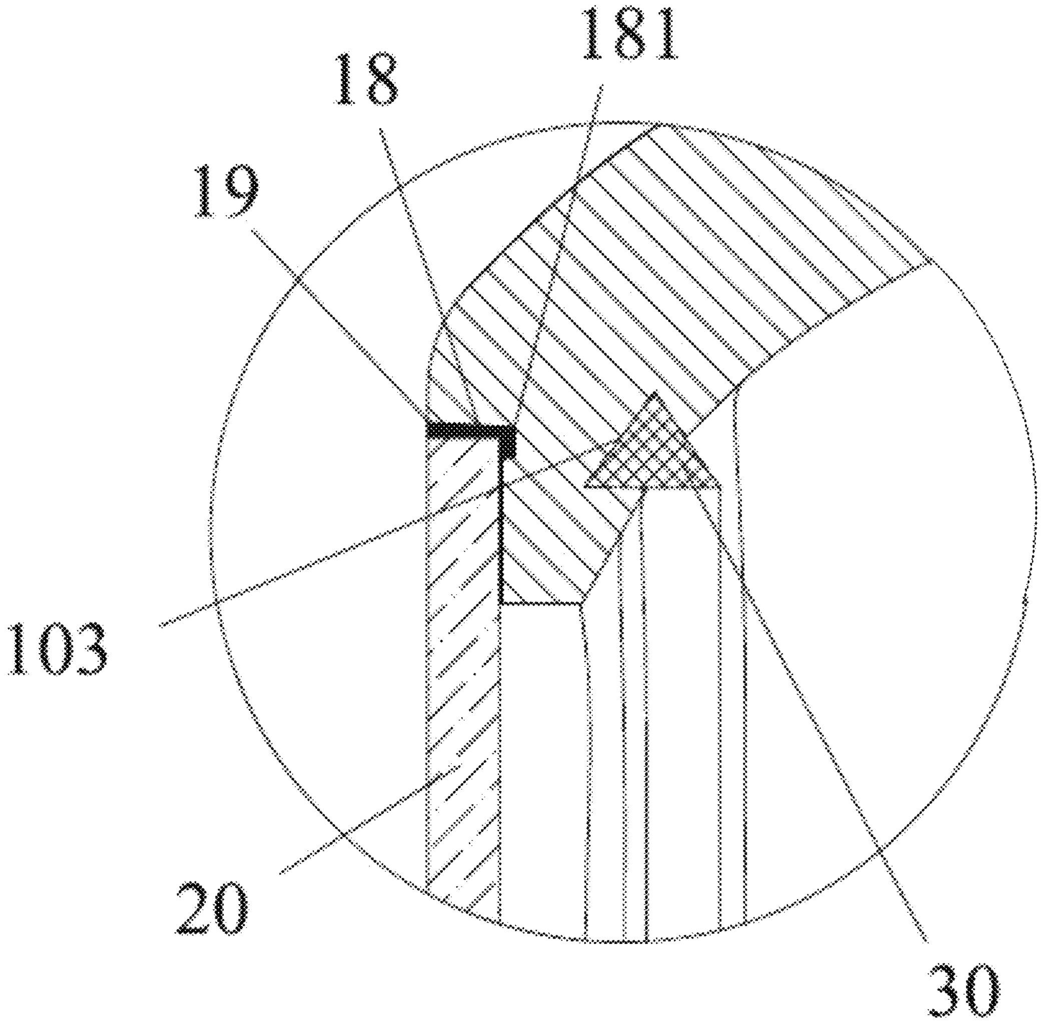
FIG. 5 is a schematic diagram of part A in FIG. 4.

As shown in FIGS. 4 and 5, the waterproof groove 103 is in the shape of a dovetail groove. The depth of the waterproof groove 103 is wider and the opening of the groove is narrower. This closing structure can better pull the waterproof ring 30 and prevent it from falling off. In addition, the waterproof ring 30 does not need to be fixed to the waterproof groove 103 by means of separate installation, but when the main body of the protective case is formed in the mold, the waterproof ring is molded by the same set of molds by injection molding, so that the waterproof ring and the main body is more firmly combined, and the assembly cost is saved.

Since the main body 10 is made of hard plastic or rubber, the waterproof ring 30 is made of soft plastic, rubber, or silicone. The hard main body 10 has better anti-collision and anti-fall performance, and the material looks generous and textured. The waterproof ring 30 must be made of a soft material, such as silica gel, and requires over-molding so that the waterproof ring 30 can be combined with two different materials of the main body 10.

As shown in FIGS. 4 and 5, the cross section of the waterproof ring 30 is a triangle, two corners of which are embedded in the waterproof groove 103, the third corner is exposed outside the waterproof groove 103, and the part of the waterproof ring exposed outside the waterproof groove 103 is flexible, protruding toward the cavity 15, so it can better contact the glass surface of the smart watch after use, forming a water isolation effect between the glass surface and the protective cover.

Figure 6:
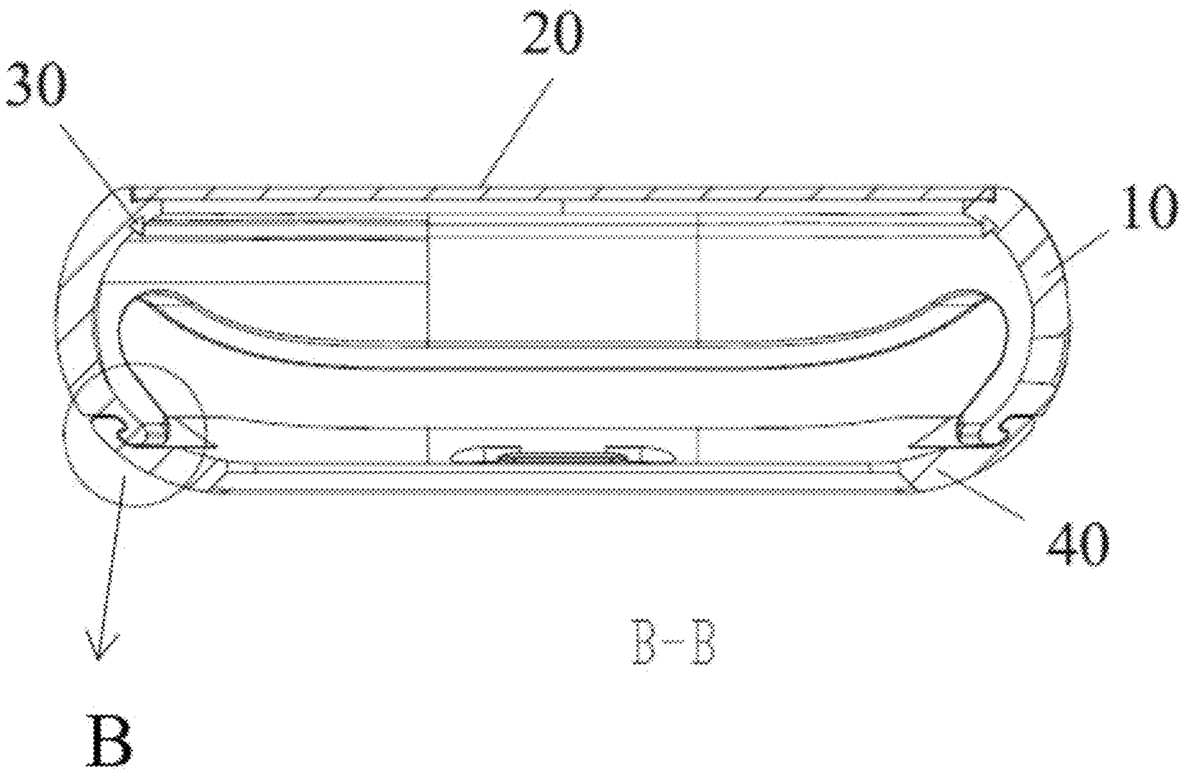
FIG. 6 is the schematic diagram of B-B in FIG. 3.
Figure 7:
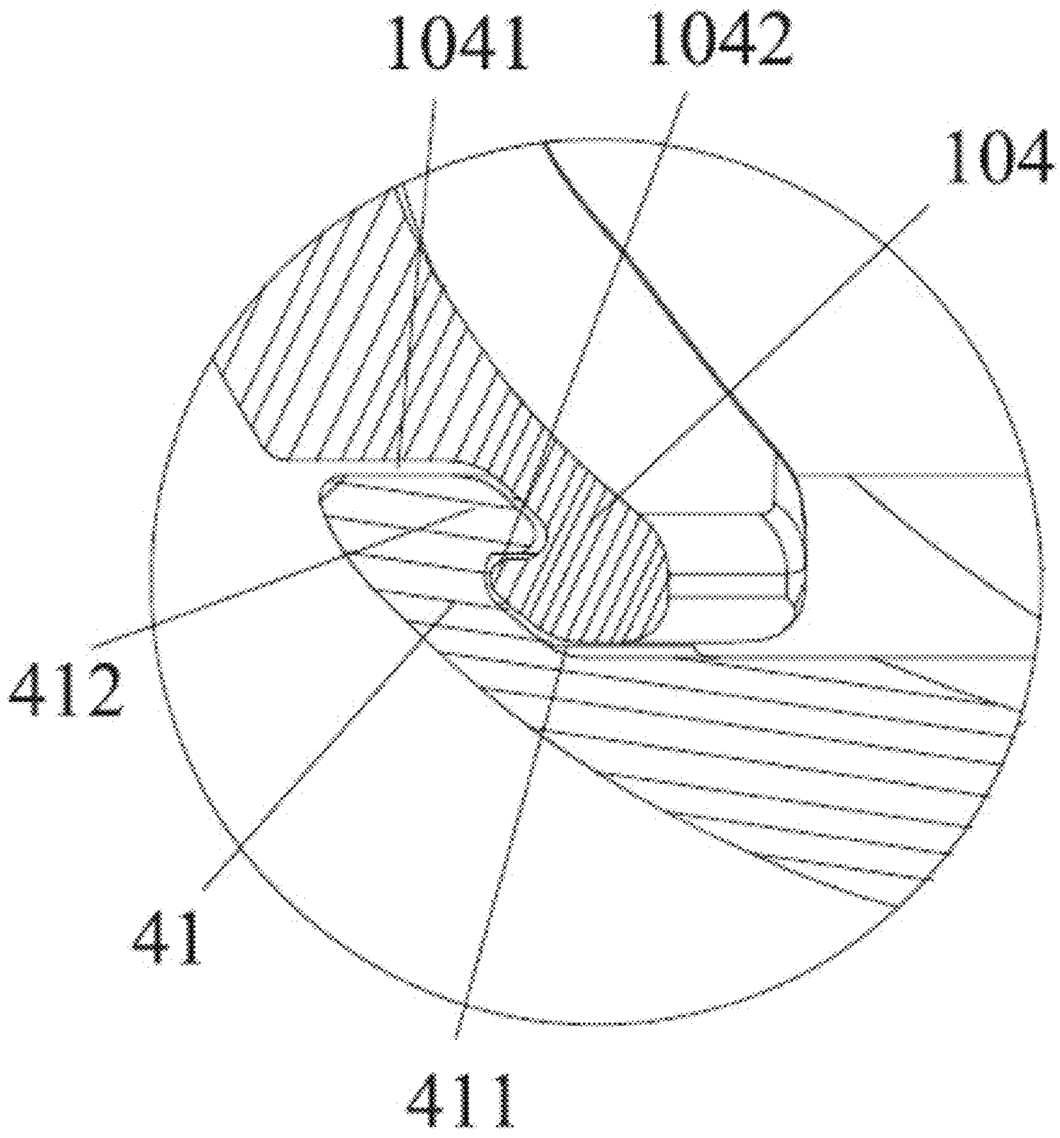
FIG. 7 is a schematic diagram of part B in FIG. 6.

The bottom cover 40 is fastened to the main body 10. The bottom cover 40, the main body 10, and the transparent cover 20 form a complete enclosure for the smart watch, which has a good protective effect. As shown in FIGS. 6 and 7, in this embodiment, bottoms of a set of the wrapping edges opposite to each other of the main body 10 without the dodge opening 17 is provided with a first inverted buckle 104, and a set of the wrapping edges opposite to each other of the bottom cover 40 is provided with a second inverted buckle 41, wherein when the first inverted buckle 104 is combined with the second inverted buckle 41, the bottom cover 40 is fixed to the main body 10. The first inverted buckle 104 and the second inverted buckle 41 are detachable structures. When the smart watch needs to be removed from the cavity 15, the bottom cover 40 should be opened first.

More specifically, the first inverted buckle 104 is integrally connected with the main body 10, and is formed by concave and convex on the bottom edges of the outer sides of a set of opposite wrapping edges 11, 13, wherein the concave position forms the first buckle groove 1041, and the convex part forms the first hook portion 1042. The second inverted buckle 41 is integrally connected with the bottom cover 40, because the bottom cover is not a complete plane, but a concave structure with a horizontal upturn around the bottom surface. Therefore, the top edges of the inner sides of the upturned positions on both sides of the bottom cover 40 are formed with an outer concave and inner convex shape, wherein the outer concave part forms the second buckle groove 411, and the inner convex part forms the second hook portion 412.

The first inverted buckle 104 is engaged with the second inverted buckle 41, that is, the first hook portion 1042 is buckled into the second hook portion 412, and the second hook portion 412 is buckled into the first buckle groove 1041 to form a stable interlocking relationship.

The center of the bottom cover 40 is provided with an induction hole, and the induction hole is circular. The positions on both sides (without inverted buckles) of the bottom cover corresponding to the watch strap of the smart watch are provided with strap button holes 42. This is because some models of smart watches have a detachable structure between the strap and the main body of the smart watch, and a button for removing the strap is provided on the main body of the smart watch. Therefore, the bottom cover 40 is also provided with a strap button hole 42 at a position corresponding to the button for removing the strap. In addition, the button hole 42 of the watch strap is provided with a press block 43, the connection between the press block 43 and the bottom cover 40 is suspended, and the connection is connected by the cantilever 421. Therefore, during use, the press block 43 can be exerted force, and then the button for releasing the watch strap can be triggered by the press block 43, so as to achieve the effect of releasing the watch strap.

Embodiment 2

Figure 8:
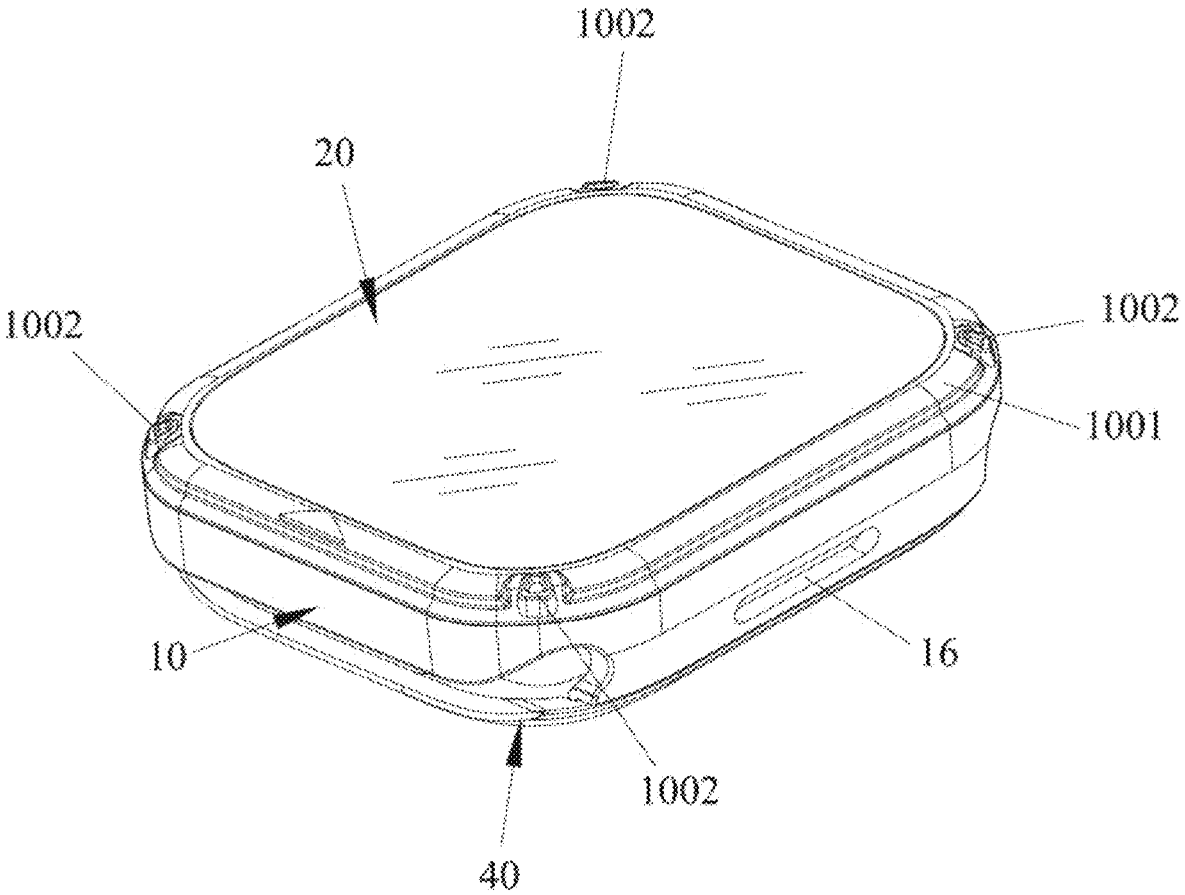
FIG. 8 is a schematic perspective view of a second embodiment of the present application.
Figure 9:
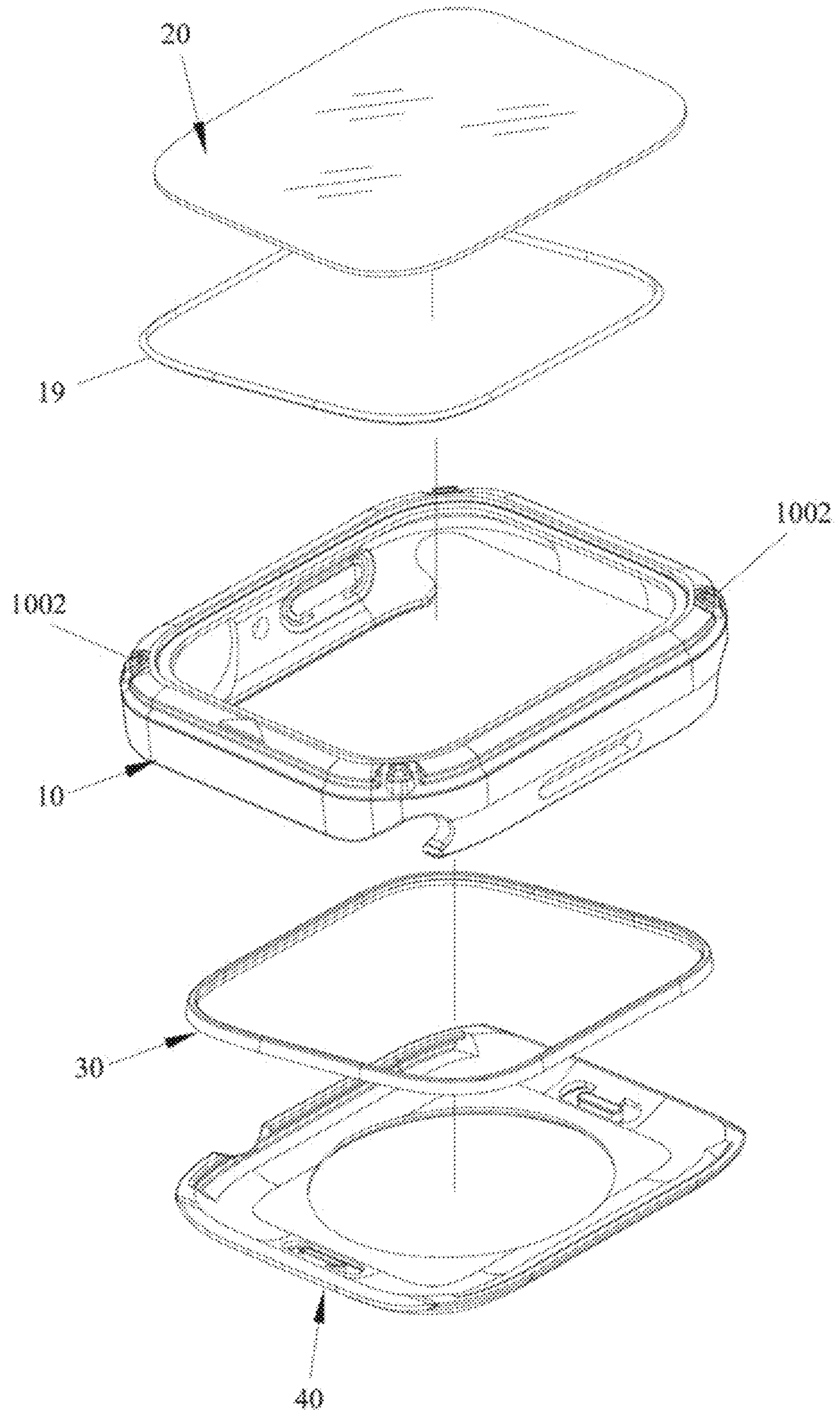
FIG. 9 is an exploded view of a second embodiment of the present application.
Figure 10:
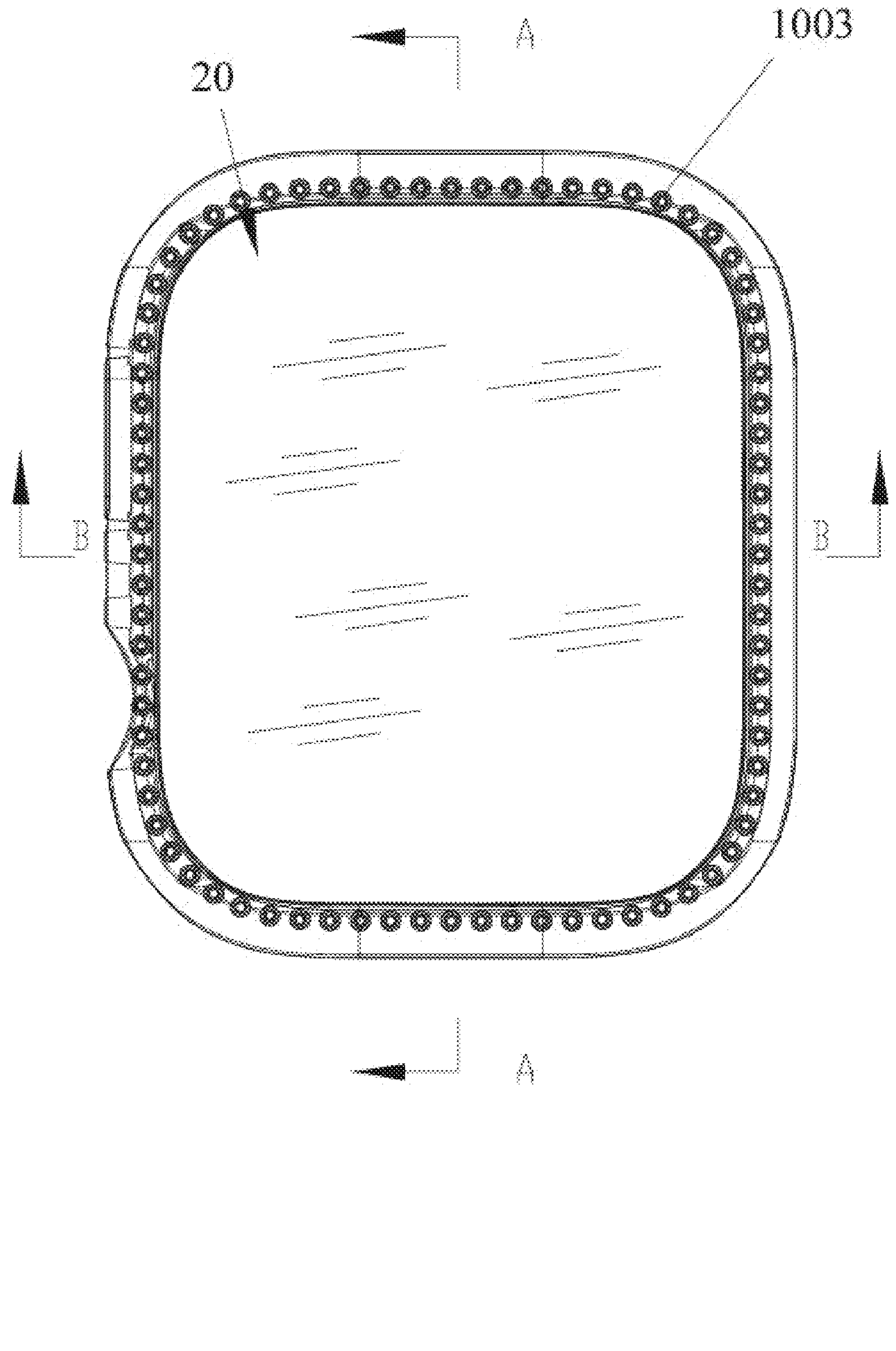
FIG. 10 is a top view of a third embodiment of the present application.
Figure 11:
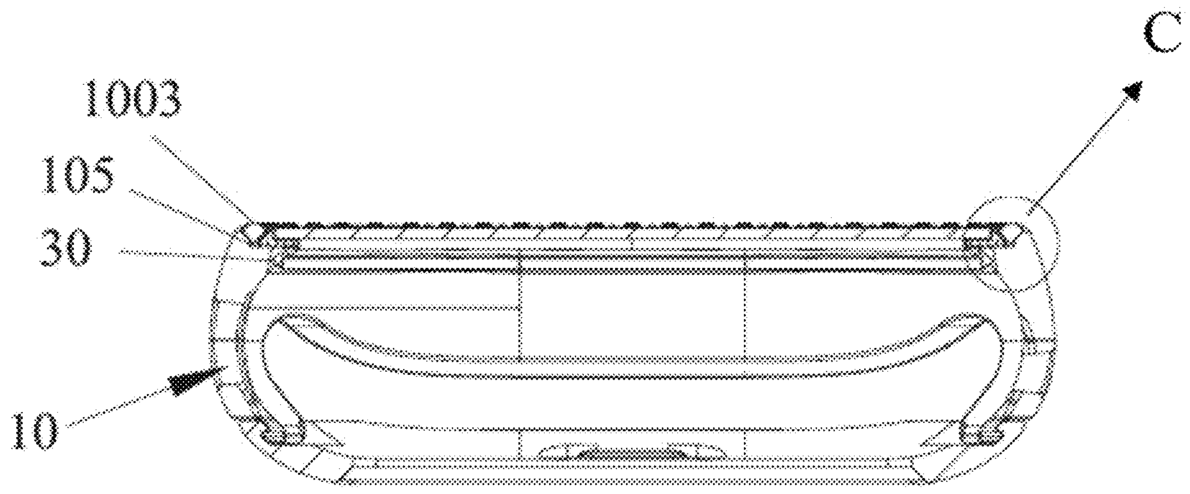
FIG. 11 is a schematic diagram of part C in FIG. 10.
Figure 12:
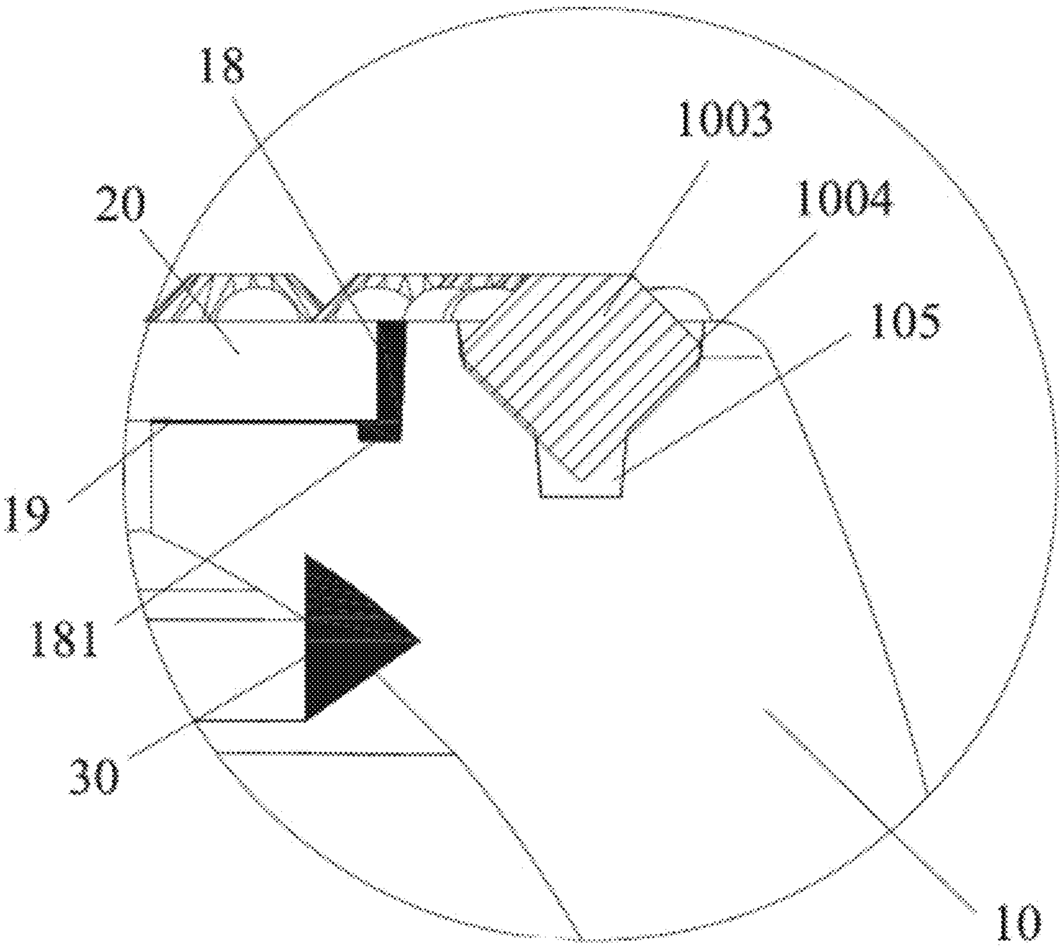
FIG. 12 is the schematic diagram of A-A in FIG. 10.
Figure 13:
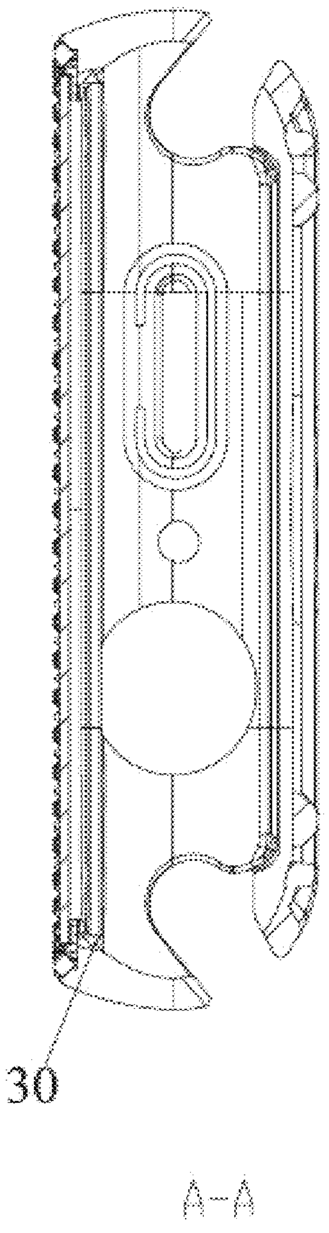
FIG. 13 is the schematic diagram of B-B in FIG. 10.

FIG. 8 to 9 show the specific structure of the second preferred embodiment of the present application, which is a waterproof protective case for smart watches. The structural design of this embodiment is basically the same as that of the first embodiment, and the difference lies in the shape structure of the main body 10.

In the main body 10 of the protective case according to the present embodiment, the side edges 102 of the first wrapping edge 11, the second wrapping edge 12, the third wrapping edge 13 and the fourth wrapping edge 14 are in an upright structure, which is different from the arc-shaped transition structure of Embodiment 1. The top edge 101 of each wrapping edge has a wider display surface 1001, thereby making the smart watch protective case more three-dimensional and giving people a more atmospheric feeling. In particular, the large display surface 1001 can be marked with trademarks, fonts, patterns, etc., to show individuality and to highlight the brand. In addition, an anti-collision protrusion 1002 is also provided at the corner position between the two adjacent wrapping edges, which not only enhances the anti-collision performance, but also plays a better decorative role.

Embodiment 3

FIG. 10 to 13 show the specific structure of the third preferred embodiment of the present application, which is a waterproof protective case for smart watches. The structural design of this embodiment is basically the same as that of the first embodiment, and the difference lies in the shape structure of the main body 10. In this embodiment, a circle of diamonds 1003 is arranged on the top of the main body 10 of the protective case, which has a better decorative effect. And because the top surface of the diamond 1003 is higher than the level of the transparent cover 20, the transparent cover 20 can be better protected, the glass material of the transparent cover 20 can be prevented from being damaged due to collision, and it is more resistant to scratches.

A plurality of recesses 105 is formed on the top of the main body 10 of the protective case, and there is a certain space between two adjacent recesses, and the diamond 1003 is fixed to the recesses 105 by glue. In addition, each diamond has an upper half and a lower half, and a barb 1004 is arranged between the upper half and the lower half, and the barb can be embedded in the glue, which can prevent the diamond from falling off.

Embodiment 4

Figure 14:
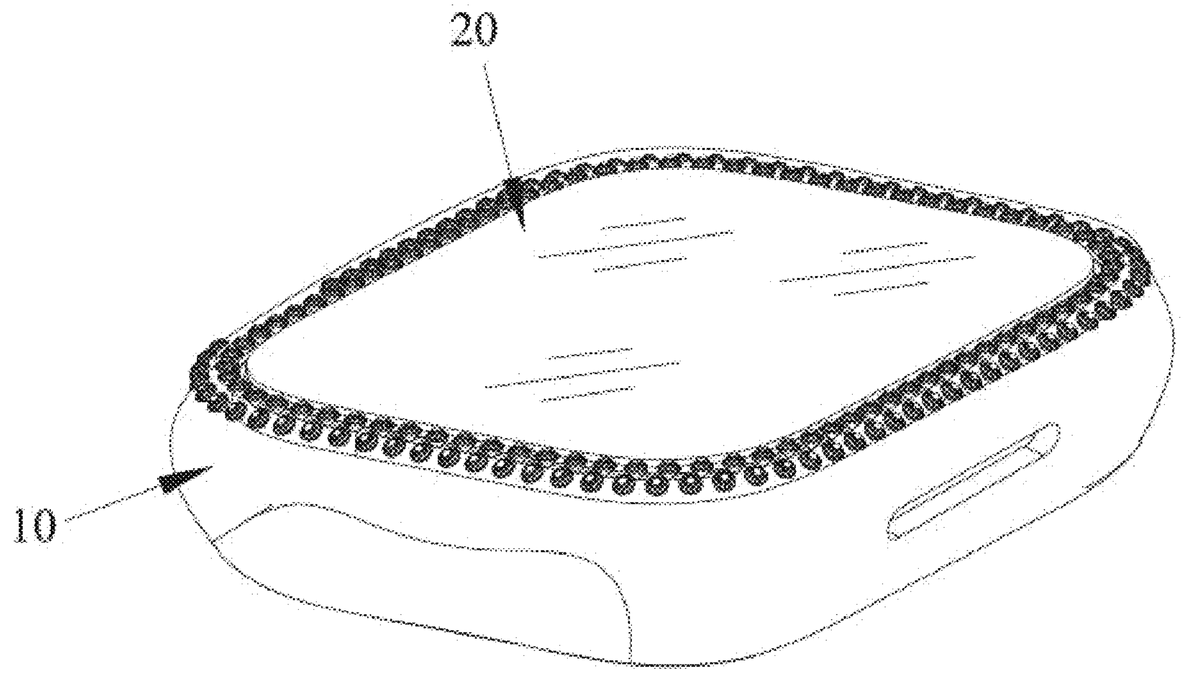
FIG. 14 is a schematic perspective view of a fourth embodiment of the present application.
Figure 15:
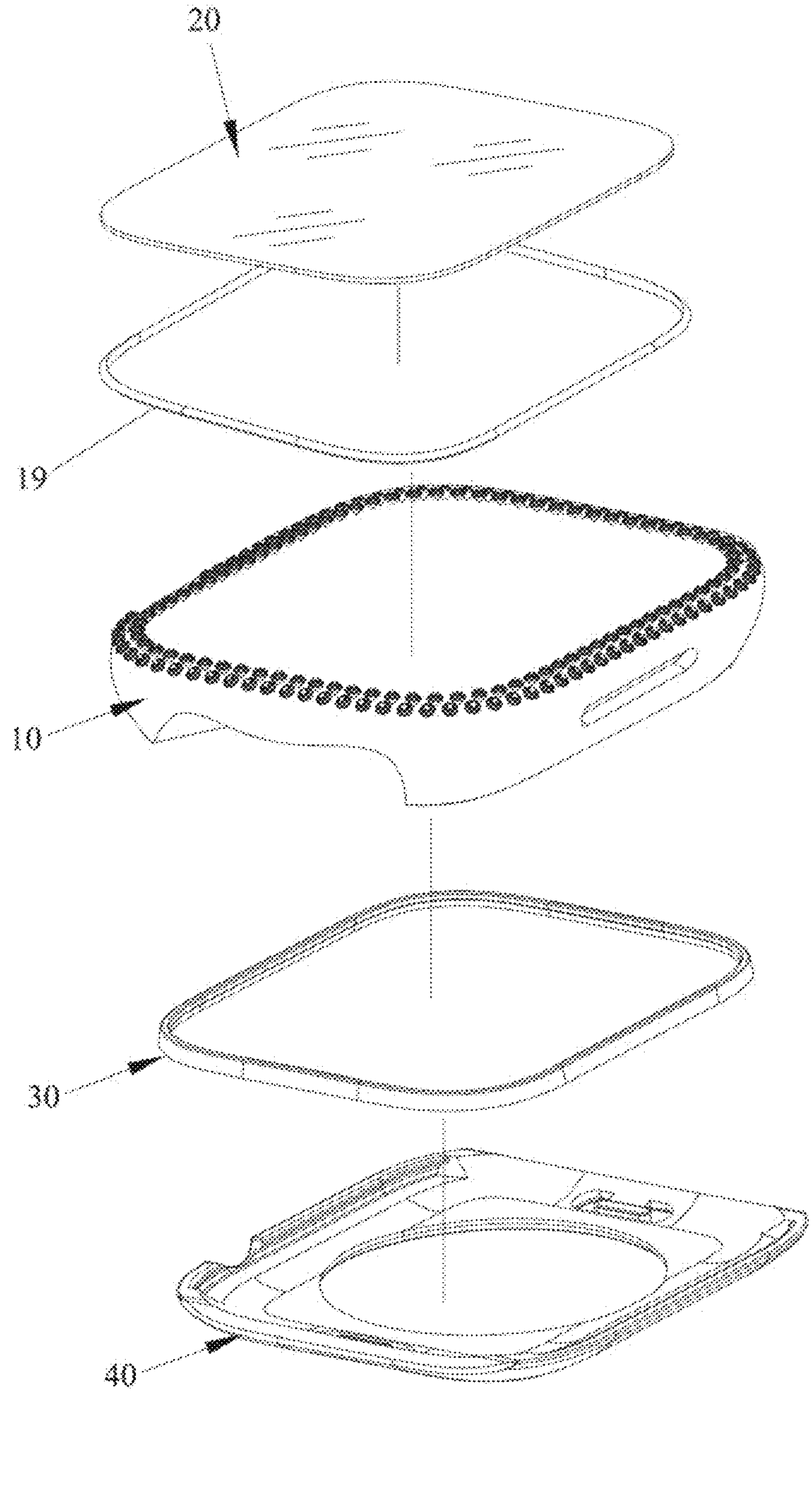
FIG. 15 is an exploded view of a fourth embodiment of the present application.

FIG. 14 to 15 show the specific structure of the fourth preferred embodiment of the present application, which is a waterproof protective case for smart watches. The structural design of this embodiment is basically the same as that of the first embodiment, and the difference lies in the shape structure of the main body 10. In this embodiment, there are two circles of diamonds 1003 on the top of the main body 10 of the protective case, which has a better decorative effect. In addition to this, diamonds 1003 may also be provided on the entire protective case body 10, that is, a full diamond effect.

To sum up, the design focus of this application lies in a waterproof protective case for a smart watch, comprising a main body 10, a transparent cover 20, a waterproof ring 30 and a bottom cover 40. The transparent cover 40 is bonded to an opening on top of the main body 10 by glue. Directly bonding with glue not only has the function of installing the transparent cover 20, but the cured glue forms an apron 19 and has the function of waterproofing. In particular, a waterproof ring 30 is additionally arranged on an inner wall surface of the main body 10, and the waterproof ring 30 is combined with the inner wall surface of the main body 10 by means of integral inlay molding, which does not need to be installed separately and does not have the problem of falling off. The function of the waterproof ring 30 is to press the glass surface of the smart watch to prevent water vapor from seeping into the inside of the smart watch, so that the watch protective case can achieve a better waterproof effect.

The above are only the preferred embodiments of the present application, and are not intended to limit the present application. Therefore, any modification, equivalent replacement, improvement, etc. made to the above embodiments according to the technical practice of the present application still fall within the scope of the technical solution of the present application.

What is claimed is:

1. A waterproof protective case for a smart watch, comprising a main body, comprising a first wrapping edge, a second wrapping edge, a third wrapping edge and a fourth wrapping edge, a cavity for enclosing the smart watch is formed by connecting the wrapping edges end to end; through holes for corresponding to buttons of the smart watch are arranged on one of sets of the wrapping edges opposite to each other; a dodge opening for movement of a watch strap of the smart watch is arranged on the other set of the wrapping edges opposite to each other, a transparent cover, covering an opening on top of the main body, a concave platform is arranged on inner side of a top edge of the cavity of the main body, the transparent cover is fixed to the concave platform by glue; wherein an inner side of a bottom surface of the concave platform is also provided with a glue overflow groove for preventing the glue from overflowing, and the glue penetrates into the glue overflow groove, a waterproof ring, which is configured as an annular structure, and the waterproof ring is combined with an inner wall surface of the main body by means of integral inlay molding;

wherein the first, second, third, and fourth wrapping edge each respectively comprise a top edge and a side edge, wherein the top edge is folded toward middle, so that the size of the opening on the top is smaller than the size of the cavity, wherein a waterproof groove is provided on an inner wall surface where the top edge and the side edge meet, wherein the waterproof ring is embedded in the waterproof groove and is integrally formed with the main body by means of injection molding;

wherein the main body is made of hard plastic or rubber, and the waterproof ring is made of soft plastic, rubber, or silicone.

2. The waterproof protective case for a smart watch according to claim 1, further comprising a bottom cover, which is snapped on the main body.

3. The waterproof protective case for a smart watch according to claim 2, wherein bottoms of a set of the wrapping edges opposite to each other of the main body without the dodge opening is provided with a first inverted buckle, and a set of the wrapping edges opposite to each other of the bottom cover is provided with a second inverted buckle, wherein when the first inverted buckle is combined with the second inverted buckle, the bottom cover is fixed to the main body.

4. The waterproof protective case for a smart watch according to claim 2, wherein positions on both sides of the bottom cover corresponding to the watch strap of the smart watch are provided with strap button holes.

5. The waterproof protective case for a smart watch according to claim 4, wherein a pressing block is provided on the strap button hole.

6. The waterproof protective case for a smart watch according to claim 1, wherein the transparent cover is tempered glass, and an explosion-proof film is compounded on one side of the tempered glass.

7. The waterproof protective case for a smart watch according to claim 1, wherein the through holes corresponding to the buttons of the smart watch comprise a first through hole, a second through hole and a third through hole located on the first wrapping edge, and a fourth through hole located on the third wrapping edge.

* * * * *